United States Patent [19]

Claudon

[11] Patent Number: 4,630,335
[45] Date of Patent: Dec. 23, 1986

[54] FISH PROCESSOR

[76] Inventor: Brian J. Claudon, 1604-127th SE, Bellevue, Wash. 98005

[21] Appl. No.: 507,798

[22] Filed: Jun. 24, 1983

[51] Int. Cl.⁴ .................. A22C 25/08; A22C 25/14
[52] U.S. Cl. ........................................... 17/58; 17/61
[58] Field of Search ................................ 17/58, 53, 61

[56] References Cited

U.S. PATENT DOCUMENTS

| | | | |
|---|---|---|---|
| 1,217,809 | 2/1917 | Nicholson | 17/58 |
| 1,471,567 | 10/1923 | Nicholson | 17/58 |
| 1,687,922 | 10/1928 | Baader . | |
| 2,031,856 | 2/1936 | Rowton et al. . | |
| 2,704,378 | 3/1955 | Schlichting . | |
| 2,832,988 | 5/1958 | Schlichting . | |
| 2,917,772 | 12/1959 | Schlichting . | |
| 3,303,526 | 2/1967 | La Pine et al. . | |
| 3,309,730 | 3/1967 | Michael . | |
| 3,570,047 | 3/1971 | Bartels . | |
| 3,925,846 | 12/1975 | Leander | 17/58 X |
| 4,091,506 | 5/1978 | Soerensen et al. | 17/58 X |
| 4,215,452 | 8/1980 | Nagrotzki . | |
| 4,356,596 | 11/1982 | Gundersen et al. . | |
| 4,442,569 | 4/1984 | Brower et al. | 17/58 X |

FOREIGN PATENT DOCUMENTS

| | | | |
|---|---|---|---|
| 156511 | 5/1954 | Australia | 17/58 |
| 2060237 | 6/1972 | Fed. Rep. of Germany | 17/58 |
| 154059 | 2/1982 | German Democratic Rep. | 17/58 |
| 10585 | 4/1970 | Japan | 17/58 |

Primary Examiner—Willie G. Abercrombie
Attorney, Agent, or Firm—Jensen & Puntigam

[57] ABSTRACT

A machine for precisely and predictably cutting the belly of a fish while preventing damage to the internal organs. The fish is placed upon a guide which closely parallels the interior of the belly and exits at the anal opening. As the fish is moved forward, head first, the belly skin is cut between the pelvic fins and the cut terminates at the anus.

4 Claims, 4 Drawing Figures

FISH PROCESSOR

DESCRIPTION

1. Technical Field

The present invention relates to the fishing industry and in particular to a machine for automatically and precisely slicing the stomachs without damage to the internal organ of a variety of different sized fish, whether or not the head has been removed.

2. Background Art

Fish gutting machines have been in use for years. These machines removed decayable organs from fish's bellies with no regard to preseving these organs much less a concern about damaging them.

During the late 1960's, Japanese seafood processors approached Americans about buying salmon eggs. Up to that time, Americans had discarded these eggs, but since then, elaborate methods, largely prescribed by the Japanese, have been employed to clean, salt cure, and package the eggs. Salmon eggs shipped to Japan are consumed as caviar and salmon egg caviar is now becoming marketable in America.

Salmon eggs are assigned their highest value when all eggs remain in the egg sack (skein) and in todays market actually are worth up to 10 times the value of fresh fish per pound.

Japanese technicians supervise roe curing operations and have very strict grading rules for this product. Loose eggs and skeins whose covering is torn or cut are discarded or cannot be used to their highest value. Gentle handling of the fish and its innards during salmon gutting is required and to realize the greatest return gutting machines must be capable of extracting roe undamaged.

Previous attempts to save roe have centered on increased labor, or very complex mechanisms. Several mechanisms have been tried which were not satisfactory because they damaged roe. The practice of salmon processors hiring extra people to gently process the skeins, has proven to be too expensive. Economic conditions have bankrupted many processors and the remaining businesses are desperately cutting costs while attempting to recoup as much as possible through the sale of all parts of the fish.

In actual practice, salmon processors transport people to remote locations, pay for their food and lodging, and then pay for vast amounts of overtime work. Average peak season work hours exceed 14 hours per day, 7 days a week, and these labor costs are a heavy burden escalating prices to the consumer and reducing profits to the processor. As a matter of survival, machine processing and in particular gutting has become attractive as long as the machines maintain both fish quality and roe quality.

Applicant is aware of one machine called the Eggstractor developed about 10 years ago which gently extracts salmon roe. This machine has a value far in excess of $30,000 and only removes eggs. The machine does no gutting. This high price of the machine and single function prevent small companies from using this machine. Out of an industry comprised of hundreds of salmon processing plants, less than 30 of these plants process enough salmon to justify utilizing the "Eggstractor".

Recently, to applicants knowledge, two competitively priced salmon gutters appeared on the market. These machines slit the belly of head off salmon, remove roe and other entrails, and rinse the fish. Each of these machines tend to cut the egg skeins, thereby damaging them. Further, the machines cut bellies which teminate short of the anus, make belly cuts which curve around the pelvic fins, and do not process head on fish. These deficiencies reduce ongoing usage of the machine and the roe damage has forced several companies to discontinue using their new machines altogether.

Improvements to solve the above deficiencies have been demanded by the industry and the present invention provides those improvements. A mechanism to properly locate the fish in relation to a saw blade is provided and the blade cuts open the belly without damaging the roe.

Either head on or head off fish are placed belly down on an infeed tray. Extending outwardly above the tray is a horizontal rod. Each fish is slid along the horizontal tray so the rod enters the fish at the head end, passes through the belly adjacent the belly skin and exits through the anus. Conveying mechanisms pull the fish guided by the rod across the saw blade and then through the rest of the gutting machine.

Prior art known to the inventor and disclosing devices for processing fish include U.S. Pat. No. 2,917,772 granted Dec. 22, 1959 to Schlichting. This patent discloses an elongated guide which carries fish over a belly blade, supporting the fish from the top of the belly cavity adjacent the spine leaving belly organs fully exposed to the blade. Support and guidance of the fish with this invention depends on the backbone sliding along the guide. Following the backbone wih the guide fully exposes belly organs to the saw blade and salmon roe skeins would be severely damaged. Head on fish would not ride properly on the guide and could not be processed using the infeed mechanism.

U.S. Pat. No. 3,570,047 granted Mar. 16, 1971, to Bartels is a mechanism used to remove organs after the belly has been cut. It targets on removing fish livers after belly cutting and is not an infeed mechanism. Salmon roe doesn't include the same attachments as livers (cod livers especially) and would be torn apart by this device.

U.S. Pat. No. 4,356,596 granted Nov. 2, 1982 to Gunderson deals with a method of entering a fish's belly cavity through the throat cut. It pinches off the alimentary canal at its anus and does not cut the belly. This disclosure does not deal the question of straight belly cuts and further, skein tearing would undoubtably be caused by the insertion of such a complex mechanism.

With the above noted prior art and the inadequacies thereof in mind, it is an object of the present invention to provide a means for accurately cutting fish bellies without damaging roe.

Another object of the present invention is to produce straight belly cuts because high valued fish such as salmon are assigned a lower value if the cut is not straight and directly between the fish's pelvic fins. This lowered commercial value stems from the notice of low quality created by poor processing. Poor belly cuts imply poor handling in general.

Yet another object of the present invention is to always end the belly cut at the anus. Fish cut short of the anus or beyond it are down graded. The present mechanism allows the gutting machine operator to control the belly cut by feeding each fish so the belly rod exits at the anus every time. When this belly rod is placed correctly through the fish, the saw blade cuts exactly to the anus.

Another object of this invention is to provide a mechanism which cuts fish bellies over a wide size range without damaging roe. Fish are caught at random, which means they arrive at the processing plant in varying sizes, all of which must be gutted as efficiently as possible. Processors want to run a small fish right after a large one without stopping to adjust the machine. This infeed apparatus will accept 2 lb. up to 18 lb. salmon automatically without requiring an adjustment.

Still another object of the present invention is to accurately locate each fish in 4 directions, laterally and vertically for proper belly slicing and cleaning through the gutting machine. This invention presses the inside of the belly wall up against the belly rod thereby locating each fish at the proper elevation. Also, the "V" trough infeed tray centers each fish horizontally.

Yet another object of this invention is to allow both head on or head off fish to be loaded into a gutting machine. Some fish processors have markets requiring their fish cut with heads off and some with heads on. Other need to produce both head on and head off fish all in the same day. The present invention processes head on and head off fish sequentially.

BEST MODE FOR CARRYING OUT THE INVENTION

Figure 1:
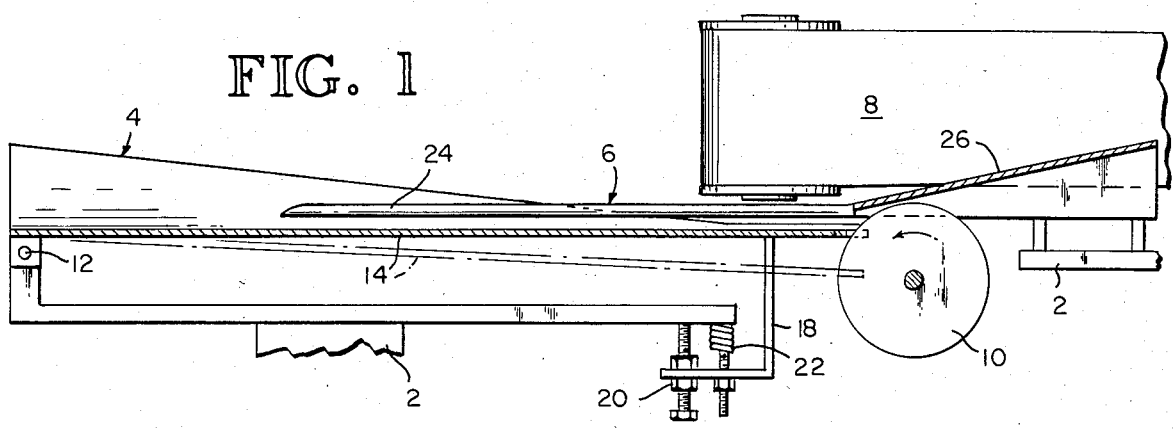
FIG. 1 is a longitudinal section view of a mechanism which will locate a fish and slice the fish's belly.
Figure 4:
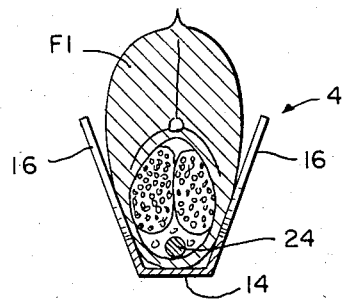
FIG. 4 is a vertical section view of a fish resting on the mechanism.

FIG. 1 depicts in a somewhat schematic fashion the preferred embodiment of the present invention. As can be seen in this view, the belly slicing machine includes a framework generally designated as 2 to which are secured an adjustable tray 4, the probe and guide mechanism 6, the fish conveying belts 8 and the drive for the blade 10 as described in greater detail hereinafter. Pivotally mounted to the frame 2 about point 12 the tray 4 includes, as best seen in FIG. 4, a base portion 14, and two upwardly extending outwardly flared sides 16 such that a fish will be placed within the tray belly down and held in an upright condition. As seen in FIG. 1, the tray sides 16 taper downwardly toward the forward end and terminate adjacent the cutting blade 10. The tray 4 is held in a pivotal upwardly biased adjustable condition by means of a bracket member 18 which is secured to the bottom of the tray 4. The tray 4 is adjustable in its position relative to the probe 6 by means of adjustment nut 20 and held in an upwardly biased condition by means of spring member 22.

As mentioned hereinabove, the probe is secured to frame member 2 and comprises a probe member 24 which is designed to be inserted into the fish from its forward end and exit through the anus and a rearwardly open hood portion 26 which is designed to limit the depth of the cut by means of the blade 10 and further to lift the following portion of the fish following the cut to the anus.

It is to be noted that the fact that the probe is relatively fixed and the tray 4 is pivoted about point 12 allows the tray to automatically adjust for the different sized fish but also assures that the probe end of member 6 is always directed downwardly toward the skin side of the internal belly cavity preventing damage to internal organs.

Following insertion of the fish by hand, assuring the proper placement of probe member 6 the fish is moved forward until it is contacted on opposite sides by conveyor belts 8 which draw the fish forwardly causing the blade 10 to slide the belly and the entire fish to ride up over the hood member 26 to be exited for further processing.

Figure 2:
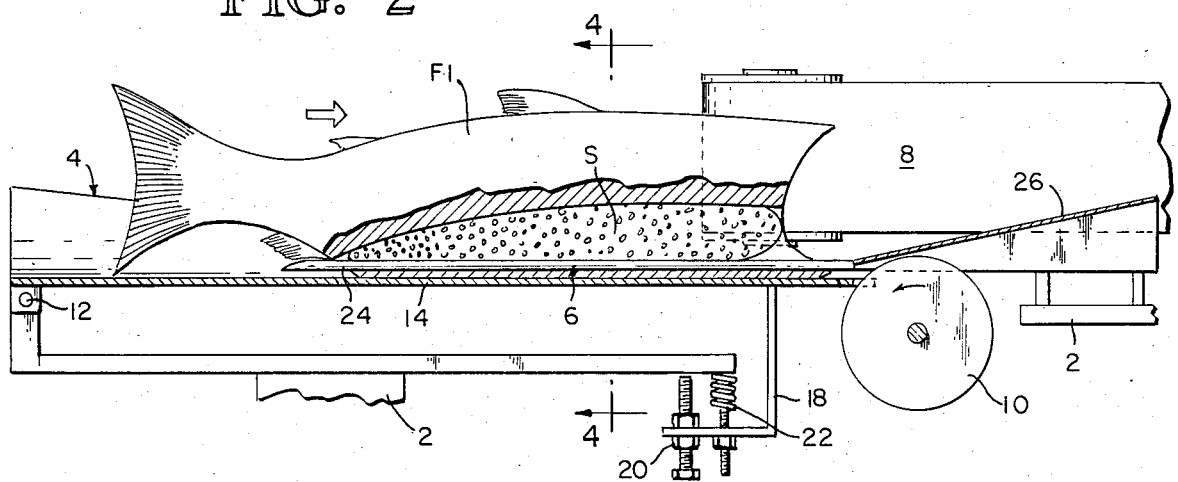
FIG. 2 is a cut away view of a fish sliding onto the belly rod with the general relationship between belly organs and rod.

Referring now to FIG. 2, the inventive apparatus may be seen with a head off fish $F_1$ in place with the probe 6 extending through the belly cavity beneath the egg skeins S and out the anus. At about this point, the drive belts 8, one on each side of the fish actually grip the fish moving it forward until the saw blade 10 has cut the belly skin and the tail of the fish rides up over the top of the guard 26 to be exited for further process.

Figure 3:
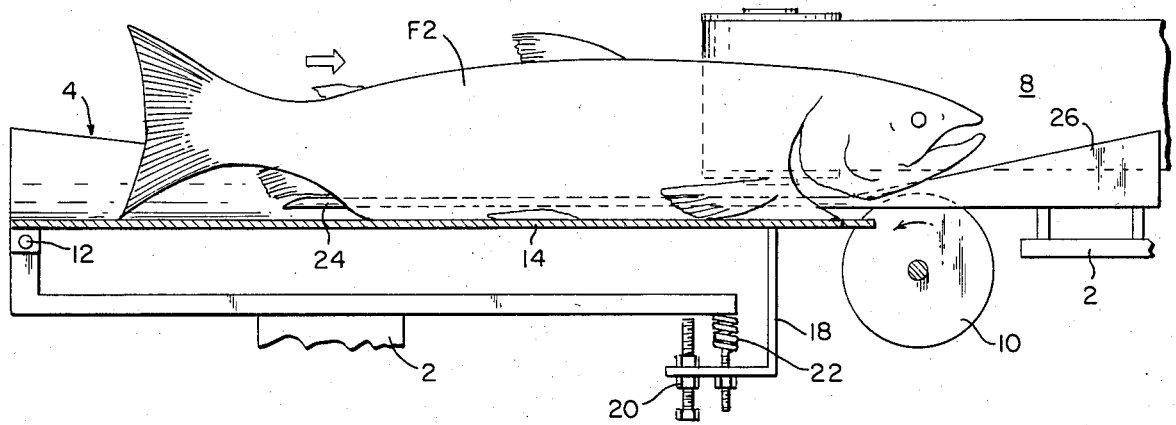
FIG. 3 shows how a head on fish is loaded onto the mechanism.

As seen in FIG. 3, a head on fish $F_2$ is shown in a similar position illustrating the fact that the device may be used for either head on or head off fish. Further to be seen in this view is the fact that the tray 4 has been pivoted downwardly slightly to accommodate the fish being cut.

Thus it can readily be seen that the present device provides a means for accurately and dependently cutting the fish belly prior to gutting while assuring that the fish will be of first rate quality.

I claim:
1. A machine for slicing the belly skin of a fish without damage to the viscera, the slice terminating at the anus comprising:
   an upwardly open tray for supporting and guiding a fish in a tail following, belly down condition,
   an elongated straight rod having a first end overlying and spaced from the tray and a second end contiguous with a downwardly open hood, said rod being of sufficient length to extend along the inside of the belly skin from the front of the fish and exit the anus,
   cutter means mounted within the hood such that a fish placed upon the rod and moved forwardly allows the belly to be sliced, terminating at the anus, without damaging the viscera.

2. A machine as in claim 1 wherein the tray is adjustable varying the distance between the tray and the rod to accommodate fish of different belly thickness.

3. A machine as in claim 1 and further including feed belts adjacent the rod to move the fish past the cutter.

4. A machine as in claim 2 wherein the tray is pivotally mounted at one end and the other end is spring biased toward the rod.

* * * * *